United States Patent
Rogala

[11] Patent Number: 5,370,440
[45] Date of Patent: Dec. 6, 1994

[54] INERTIA RESPONSIVE LATCHING MECHANISM FOR SEAT ASSEMBLIES

[75] Inventor: Richard L. Rogala, Linden, Mich.

[73] Assignee: Lear Seating Corporation, Southfield, Mich.

[21] Appl. No.: 920,242

[22] Filed: Jul. 27, 1992

[51] Int. Cl.$^5$ ............................................. B60N 2/42
[52] U.S. Cl. ................................ 297/216.14; 297/353
[58] Field of Search .......... 297/216, 353, 379, 378.11, 297/216.1, 216.14

[56] References Cited

U.S. PATENT DOCUMENTS

| | | | |
|---|---|---|---|
| 2,732,003 | 1/1956 | Williams | 297/378.11 |
| 3,578,376 | 5/1971 | Hasegawa | 297/216 |
| 4,082,353 | 4/1978 | Hollowell | 297/216 |
| 4,118,067 | 10/1978 | Tanaka | 297/216 |
| 4,318,569 | 3/1982 | Bilenchi et al. . | |
| 4,366,984 | 1/1983 | Klueting et al. | 297/216 |
| 4,390,208 | 6/1983 | Widmer et al. . | |
| 4,429,919 | 2/1984 | Klueting et al. . | |
| 4,634,182 | 1/1987 | Tanaka . | |
| 4,707,010 | 11/1987 | Croft et al. . | |
| 4,720,145 | 1/1988 | Bell . | |
| 4,909,571 | 3/1990 | Vidwans et al. . | |
| 4,918,482 | 4/1990 | Landis et al. . | |
| 5,035,465 | 7/1991 | Hanai et al. . | |
| 5,100,202 | 3/1992 | Hughes . | |

FOREIGN PATENT DOCUMENTS 0197808  8/1978  Germany ...................... 297/378.11

Primary Examiner—Kurt C. Rowan
Assistant Examiner—James Miner
Attorney, Agent, or Firm—Reising, Ethington, Barnard, Perry & Milton

[57] ABSTRACT

A vehicle seat assembly (10) includes a backrest member (14) pivotably coupled to a seat member (12) for enabling the seat to pivot between a generally upright design position (D) and a reclined position (R). An inertia responsive latch mechanism (18) is operative in response to the assembly (10) being subjected to sudden acceleration forces, as when the vehicle is involved in a rearend collision, for locking the back rest member (14) against rearward pivotal movement toward the reclined position (R).

11 Claims, 3 Drawing Sheets

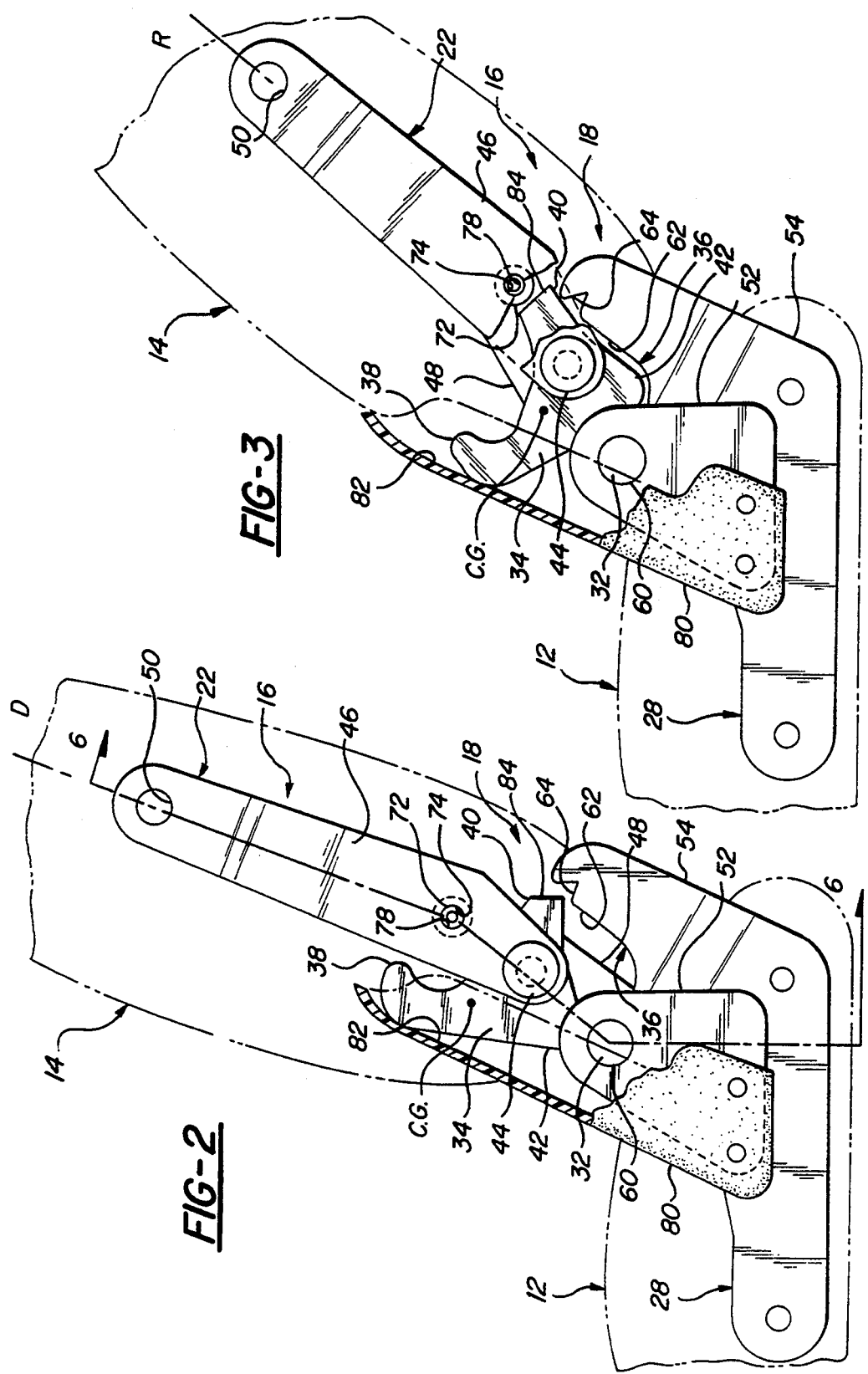

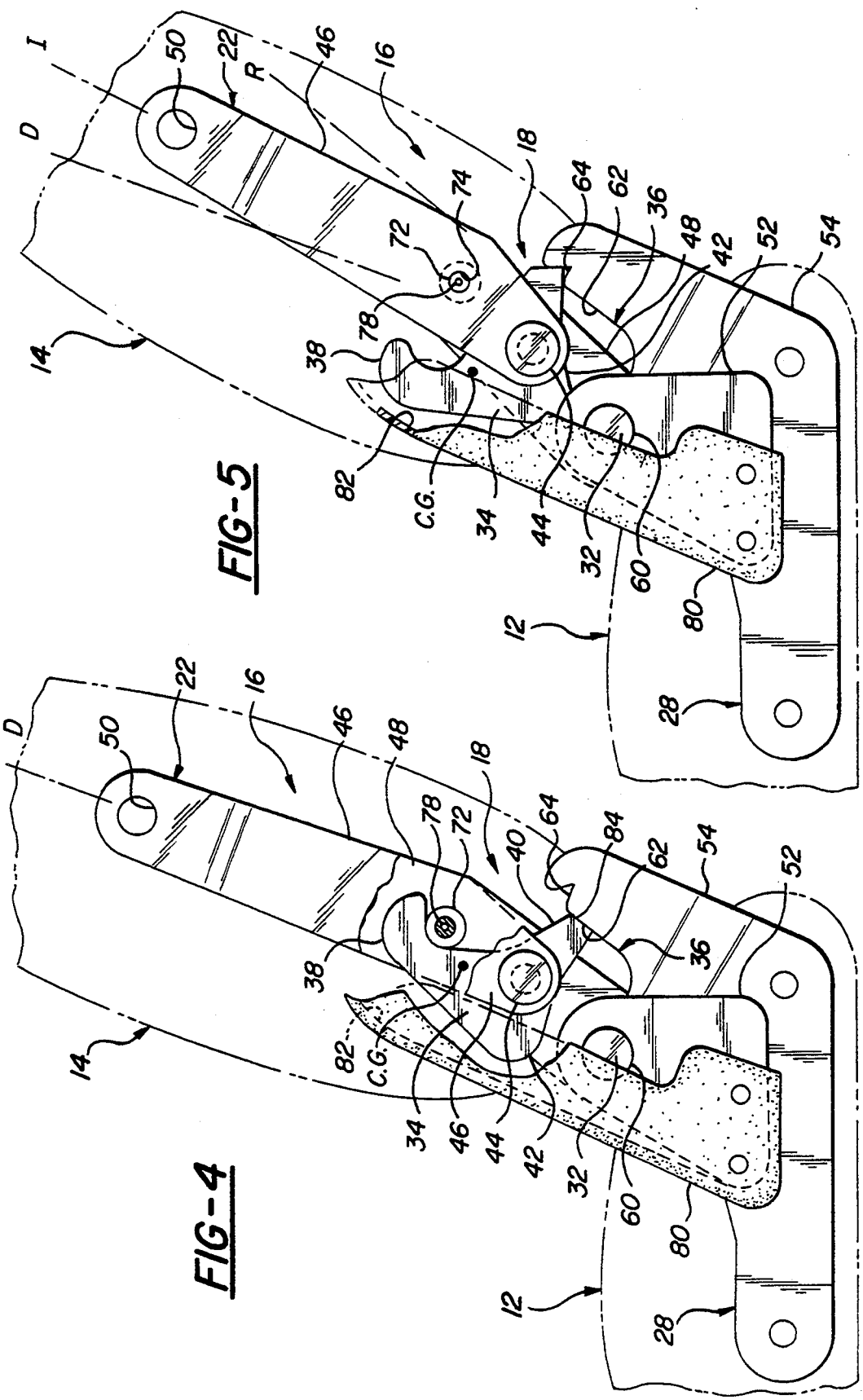

INERTIA RESPONSIVE LATCHING MECHANISM FOR SEAT ASSEMBLIES

TECHNICAL FIELD

The present invention relates generally to adjustable vehicle seats.

BACKGROUND OF THE INVENTION

Many vehicle seat assemblies are known in which a backrest member of the assembly is hinged to a lower seat cushion for enabling the backrest to pivot forwardly or rearwardly with respect to the seat cushion. There are also a variety of inertia responsive latch mechanisms known to the art which lock the backrest against forward tilting movement in the event the vehicle experiences sudden deceleration, such as might occur during a panic stop or as a result of a frontal collision. One such latch mechanism is disclosed in U.S. Pat. No. 4,919,482 to Landis et al, granted Apr. 24, 1990 and assigned to the assignee of the present invention.

Rearward tilting of the backrest member is conventionally controlled by a reclining mechanism, of which there are many types known to the art. All known seat assemblies rely exclusively on the reclining mechanism to prevent undesirable rearward tilting of the backrest in the event the vehicle undergoes sudden acceleration, as might occur, for example, if involved in a rearend collision. Such reclining mechanisms, however, are prone to failure if subjected to extreme reclining forces.

SUMMARY OF THE INVENTION AND ADVANTAGES

A seat assembly for an automotive vehicle comprises a seat member for attachment to a support structure of the vehicle; a backrest member hingedly coupled to the seat member for movement between a generally upright position with respect to the seat member and a reclined position in which the backrest member is tilted rearwardly of the upright position angularly away from said seat member. The assembly is characterized by inertia responsive latch means for locking the backrest member against rearward tilting movement toward the reclined position in response to the seat assembly being subjected to sudden acceleration forces.

The assembly may be used alone or in combination with any conventional reclining mechanisms. The inertia responsive latch means, however, acts independently of such reclining mechanism so as to positively lock the backrest member against inadvertent rearward tilting movement.

BRIEF DESCRIPTION OF THE DRAWINGS

Other advantages of the present invention will be readily appreciated as the same becomes better understood by reference to the following detailed description when considered in connection with the accompanying drawings wherein:

FIG. 2 is a side view of the assembly shown partially broken away illustrating the backrest in the upright design position and the latch pawl in an inoperative position;

FIG. 3 is a view like FIG. 2 but showing the backrest in the fully reclined position;

FIG. 4 is also a view like FIG. 2 but showing the latch pawl rotated into an operative locking position;

FIG. 5 is a view like FIG. 2 but showing the backrest reclined rearwardly of the upright design position and with the latch pawl rotated into locking engagement with a notch in the seat hinge-arm.

DETAILED DESCRIPTION OF THE DRAWINGS

Figure 1:
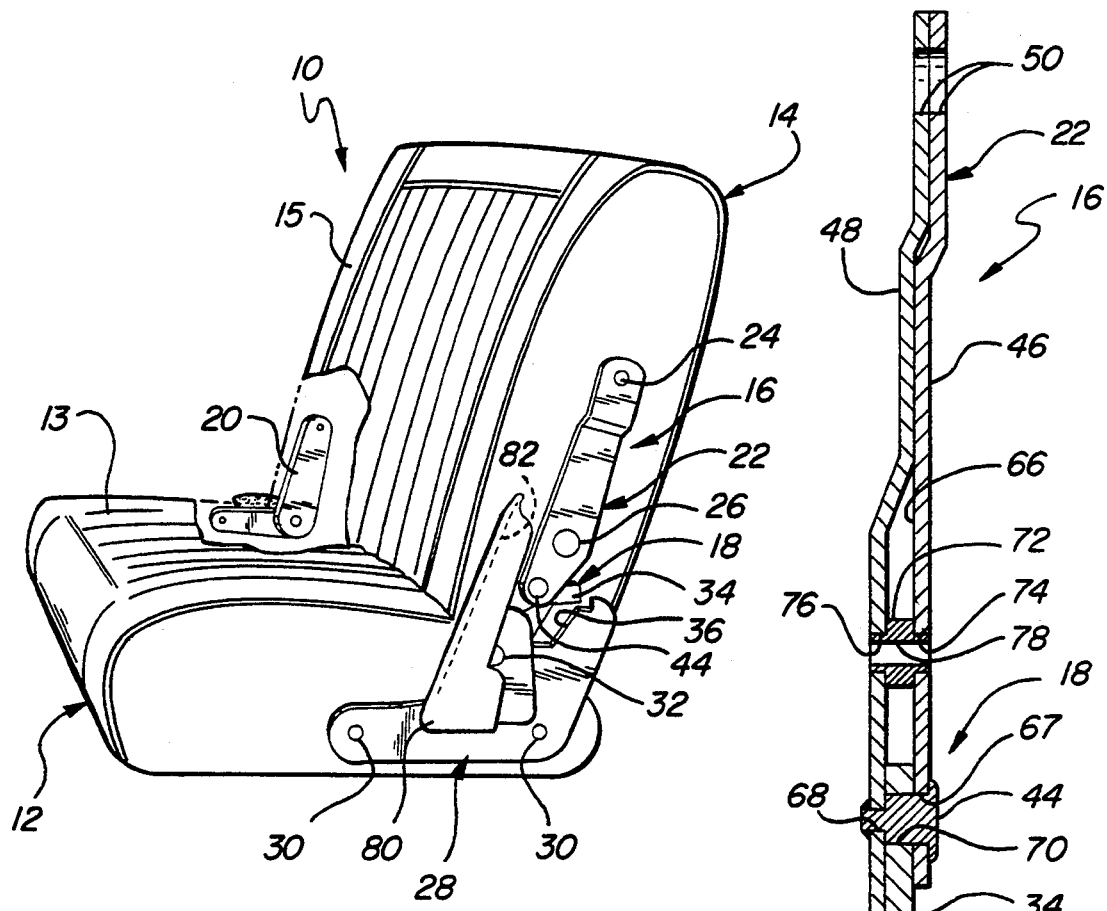
FIG. 1 is a perspective view of the seat assembly.

FIG. 1 illustrates a seat assembly 10 constructed according to a presently preferred embodiment of the invention. The seat assembly 10 comprises a generally horizontal seat member 12 for mounting to a support structure of the vehicle (e.g., the floor), a backrest member 14 and hinge means or assembly 16 coupling the backrest member 14 to the seat member 12 for enabling the backrest member 14 to pivot in relation to the seat member 12 about a first pivot axis of the hinge assembly 16 between a generally upright design position D (i.e., an angular position of the backrest member normally selected by a user when operating a vehicle), as illustrated in FIGS. 1, 2 and 4, and any of a number of reclined positions in which the backrest member 14 is tilted rearwardly of the upright position D in a direction angularly away from the seat member 12 so as to increase the angle between the seat and backrest members 12, 14. FIG. 3 illustrates the backrest member 14 having been pivoted to a fully reclined position R and FIG. 5 shows the backrest member 14 reclined rearwardly of the design position D but forward of the fully reclined position R in an intermediate position I.

The seat and backrest members 12, 14 include seat and backrest cushions 13, 15 mounted to internal support structures (not shown) of the members 12, 14 in conventional manner. The members 12, 14 may be constructed and arranged as a single occupant "bucket" seat or as a multiple occupant "bench" seat.

The assembly 10 also includes inertia responsive latch means 18 operative in response to the assembly 10 being subjected to sudden acceleration forces as might occur, for example, if the vehicle were involved in a rear end collision (i.e., hit from behind causing the vehicle and seat assembly to suddenly lunge forwardly), for locking the backrest member 14 against rearward tilting movement toward the reclined position R.

The latch means 18 may be used alone or preferably in combination with a recliner mechanism, schematically illustrated at 20 in FIG. 1. The recliner mechanism 20 may be of any type known to the art and may be provided on the same or opposite side of the seat as the inertia responsive latch means 18. Such recliner mechanisms 20 provide a means for enabling manual positioning and locking of the backrest member 14 in any selected one of a number of reclining positions of adjustment. For instance, such a mechanism 20 would enable a user to unlock the mechanism 20 and, with moderate force applied to the backrest 14, adjust the backrest 14 from the upright design position D to the fully reclined position R as well as any of a number of different positions lying therebetween, including the intermediate position I. Once positioned, the mechanism 20 self-locks to retain the backrest locked in position. The locking force provided by such mechanism 20, however, may be insufficient to retain the backrest member 14 locked if excessive reclining force is applied to the backrest 14. This might occur, for example, if the vehicle in which the seat 10 is disposed is hit from behind by another vehicle. Such would cause the vehicle and seat to lunge forwardly with a sudden acceleration which, in turn, would cause the occupant of the seat 10 to apply great force to the backrest 14 tending to urge the backrest 14 rearwardly with great force. Such force may exceed the limits of the reclining mechanism 20.

When used in combination with a recliner mechanism 20, the inertia responsive latch means 18 serves as a fail safe supplement to the recliner mechanism 20 when the seat assembly 10 is subjected to such extreme reclining forces. As mentioned, a rear collision causes the assembly 10 to undergo effectively a rapid acceleration. This event may cause the occupant of the seat to be forced rearwardly against the backrest member 14 with excessive force so as to exceed the forces normally recognized by the recliner mechanism 20. The latch means 18 responds to such excessive acceleration forces and locks the backrest member 14 against undesirable rearward reclining movement irrespective of whether the recliner mechanism 20 functions properly or not. Thus, if the reclining forces applied to the backrest 14 are of sufficient magnitude to cause the recliner mechanism 20 to inadvertently fail, the latch means 18 acts in a fail safe manner to prevent the backrest member 14 from reclining rearwardly in relation to the seat member 12 so as to prevent injury to the seat occupant.

The hinge assembly 16 comprises an upper hinge arm 22 attached to a support structure of the backrest member 14 by any suitable means, such as fasteners 24, 26, and a lower hinge arm 28 securely attached to a support structure of the seat member 12 by rivets, fasteners or other suitable means 30. A pivot pin 32 couples the upper and lower hinge arms 22, 28 together and thereby enables the backrest member 14 to pivot or tilt with relation to the seat member 12. The recliner mechanism 20 may be similarly provided with a hinge to couple the opposite side of the backrest member 14 pivotally to the opposite side of the seat member 12.

The inertia responsive latch means 18 comprises a latch pawl 34 pivotally carried by the upper hinge arm 22 and a corresponding catch 36 formed on the lower hinge arm 28. The latch pawl 34 is generally triangular in shape and has first, second, and third legs 38, 40, 42, respectively. Another pivot pin 44 couples the latch pawl 34 to the upper hinge arm 22 for enabling the pawl 34 to pivot or rock relative to the upper hinge arm 22 between an inoperative unlatched attitude (FIGS. 1-3) in which the pawl 34 is disengaged with a catch 36 and an operative latched attitude (FIGS. 4 and 5) in which the pawl 34 is positioned so as to lockingly engage the catch 36 and prevent reclining of the backrest member 14.

Figure 6:
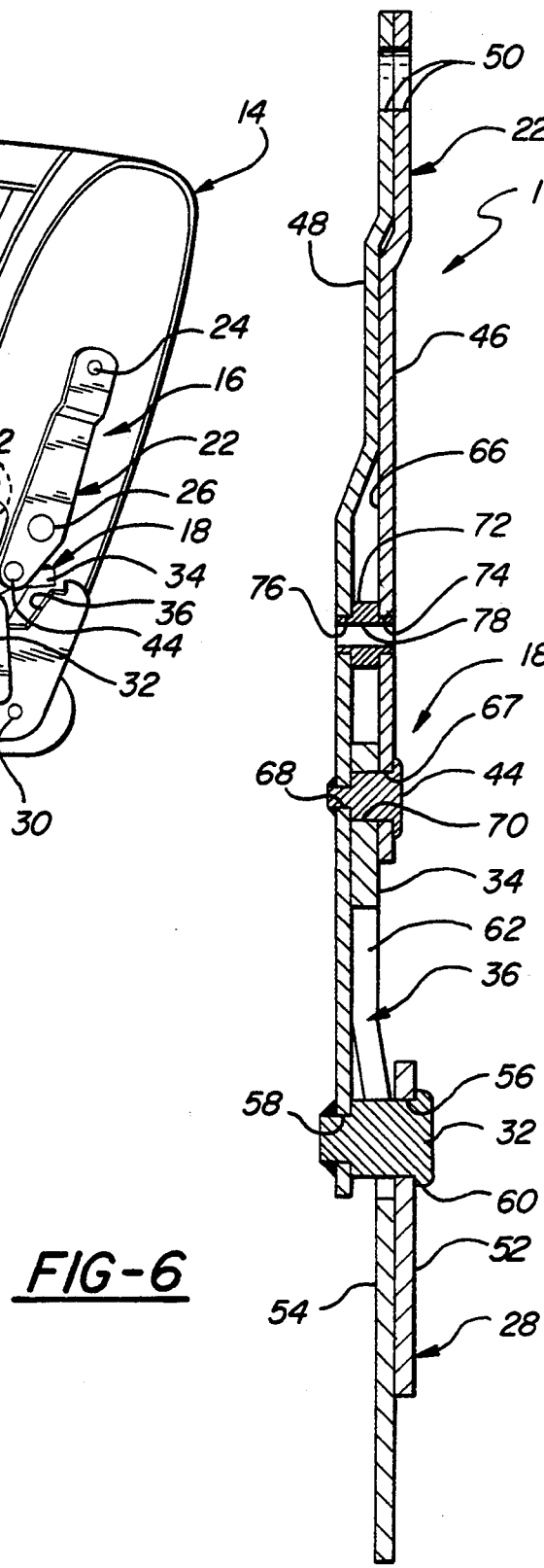
FIG. 6 is a cross-sectional view of the hinge assembly taken along lines 6—6 of FIG. 2.

As best shown in FIG. 6, the upper hinge arm 22 is comprised of outer and inner hinge plates 46, 48 formed with an aligned aperture 50 at the top for receiving the fastener 24 (FIG. 1) and attaching the hinge plates 46, 48 to the backrest support structure. The lower hinge arm 28 includes an outer pivot plate 52 welded or otherwise fastened to an inner catch plate 54. The pivot plate 52 and hinge plate 48 include aligned apertures 56, 58 through which extends the pivot pin 32 for establishing the pivot connection between the upper and lower hinge arms 22, 28. One end of the pivot pin 32 is welded or otherwise fixed to the inner hinge plate 48 (left side of FIG. 6) for rotation therewith and the opposite end of the pivot pin 32 is formed within an enlarged head 60.

The catch plate 54 is generally L-shaped with a generally horizontal lower leg thereof formed with a pair of holes 62 for insertably receiving the fasteners 30 to mount the lower hinge arm 28 to the seat member support structure. The catch plate 54 also includes a rearwardly disposed upstanding leg portion having a forward facing abutment surface defining the catch 36. The abutment surface 36 has a rearwardly inclined or sloped camming portion 62 and an upper V-shaped notch 64.

The hinge plates 46, 48 are formed with lower parallel and spaced-apart leg portions which straddle the latch pawl 34 and capture the pawl 34 within a gap 66 between the hinge plates 46, 48. The spaced-apart legs of the hinge plates 46, 48 include a pair of apertures 66, 68 which are in line with an aperture 70 of the pawl 34 and spaced above the hinge pivot axis for receiving the pivot pin 44 and mounting the pawl 34 between the hinge plates 46, 48 to enable the pawl 34 to pivot about an axis of the pin 44. As shown in FIG. 6, the pawl 34 and the catch 36 of plate 54 are disposed in a common plane so that the pawl 34 can selectively engage the catch 36.

The latch means 18 further includes a locking stop 72 fixed to the upper hinge arm 22 and disposed in the path of the latch pawl 34. The stop 72 preferably comprises a cylindrical bushing or spacer 72 disposed in the gap 66 and extending between the hinge plates 46, 48 at a location above pivot pin 44. The spacer 72 has an enlarged central portion and a pair of smaller diameter end portions which extend through correspondingly sized and aligned apertures 74, 76 of hinge plates 46, 48. The spacer 72 has a hole 78 extending therethrough for insertably receiving the fastener 26 (FIG. 1) to establish another connection between the upper hinge arm 22 and the backrest support structure.

The lower hinge arm 28 has latch pawl positioning means or a latch pawl positioning guide in the preferred form of a cover 80 which is attached to the horizontal leg of the catch plate 54 by a rivet or other suitable fastening means. The cover 80 extends upwardly from the catch plate 54 toward the pawl 34 and has an inwardly extending back wall portion 82 disposed forwardly of the latch pawl 34 and lying in the path of the latch pawl 34 for acting as a stop or barrier to forward tilting of the latch pawl 34. Thus, the back cover wall 82 and spacer 72 together limit and define the range of rotational movement of the pawl 34, with the wall 82 limiting rotation of the pawl 34 in a forward direction toward the seat member 12 (i.e., counter clockwise in the drawings) and the spacer 72 limiting rotation of the pawl 34 in a rearward direction away from the seat member 12 (i.e., clockwise in the drawings).

FIG. 2 shows the backrest member 14 positioned in the generally upright design position D, which represents a position most commonly selected by a user of the seat assembly 10 while operating the vehicle. The latch pawl 34 is mounted in such way that its center of gravity (denoted "C.G." in the drawings) is offset with respect to the latch pawl pivot axis of pivot pin 44 so that the latch 34 is normally gravity biased forwardly (i.e. counterclockwise) toward the unlatched inoperative attitude or position having its first leg 38 engaging the backwall stop portion 82 of the cover 80 and its second leg 40 swung out of engagement with the catch 36. The position of the pawl 34 in FIGS. 1 and 2 represents its position under normal operating conditions.

When the backrest 14 is reclined with moderate force, the forwardly offset center of gravity of the pawl 34 causes the pawl 34 to rotate further forwardly as the first leg 38 of the pawl 34 maintains sliding engagement with stationary backwall the stop portion 82, as illustrated by comparison of the pawl position in FIGS. 2 and 3. Comparison of these Figures also illustrates how the sliding interaction between the panel 34 and the positioning guide 80 continually adjusts the angular inoperative position of the pawl 34 to maintain a spaced relationship between the pawl 34 and the catch 36. This movement of the pawl 34 swings the second leg 40 of the pawl 34 into a position where it bypasses (i.e., does not engage) the catch 36 so as to not interfere with the normal reclining action of the backrest member 14. In other words, during normal use, the latch pawl 34 is gravity biased to an inoperative attitude so as to not interfere with the normal reclining movements of the backrest 14.

FIG. 4 illustrates the attitude of the latching pawl 34 upon rapid acceleration of the vehicle. The sudden acceleration produces a moment force on the pawl 34 oppositely of the force gravity biasing the pawl 34 toward the inoperative attitude. An acceleration moment exceeding the gravity moment will cause the pawl 34 to rotate in a clockwise direction out of engagement with the positioning guide 80 and into operative locking engagement with the catch 36 (FIGS. 4 and 5) so as to lock the backrest 14 against reclining movement away from the seat member 12. As illustrated best in FIG. 4, the distal end of the second leg 40 has a camming surface 84 which engages the cammed portion 62 of the catch 36 forcibly urging the pawl 34 toward forward rotational movement in response to the seat occupant applying a reclining force to the backrest 14 during sudden acceleration. This camming action causes the hook-like first leg 38 of the pawl 34 to forcibly engage the spacer 72 on the upper hinge arm 22 thereby preventing forward rotation of the pawl 34. The spacer 72 thus cooperates with the camming surfaces 62, 84 for maintaining the first leg 38 in abutting engagement with the camming portion 62 of the catch 36 and thereby locking the backrest 14 against reclining movement.

FIG. 5 illustrates an arrangement in which the user of the seat has initially reclined the backrest 14 rearwardly of the design position D of FIGS. 1 and 4 to an intermediate position I. Sudden vehicle acceleration in this situation causes the pawl 34 to rotate rearwardly in the same manner as previously described. However, the backrest 14 has been positioned too far rearwardly to enable the second leg 40 of the pawl 34 to engage the camming portion 62 of the catch 36. The pawl 34, however, is still able to lock the backrest 14 against reclining movement by engaging the notch 64 as illustrated in FIG. 5. The notch 64 has cooperating camming walls which wedge the lower corner of the second leg 40 into retaining engagement with the catch 36.

Upon removal of the sudden acceleration forces and the reclining force applied to the backrest 14 by the seat occupant, the pawl 34 is automatically gravity biased back to the inoperative attitude to resume normal functioning of the seat assembly 10.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than is specifically described.

What is claimed is:

1. A seat assembly for disposition in an automotive vehicle, said assembly comprising:

a seat member for attachment to a support structure of the vehicle;

a backrest member hingedly connected to said seat member for tilting movement between a generally upright position (D) with respect to said seat member and a reclined position (R) in which said backrest member is tilted rearwardly of said upright position (D) angularly away from said seat member;

a latch pawl (34) supported by said backrest member (14) for selective pivotal movement about a pivot axis of said latch pawl (34) and an associated catch (36) provided on said seat member (12), said latch pawl (34) having a center of gravity that is offset with respect to said pivot axis causing said latch pawl (34) to be gravity biased angularly toward an inoperative position out of locking engagement with said catch (36) to permit normal adjustments to be made to the tilt angle of said backrest member (14) relative to said seat member (12) and responsive to application of a sudden acceleration force to said seat assembly for pivoting into locking engagement with said catch (36) to thereby lock said backrest member (14) against rearward tilting movement toward said reclined position (R);

and pawl positioning means (80) releasably engaging and supporting said latch pawl (34) for adjusting the inoperative angular position of said pawl (34) in response to making normal adjustments to the tilt angle of said backrest member (14) to maintain said pawl (34) in predetermined spaced relation to said catch (36) and for releasing said pawl (34) in response to the application of said sudden acceleration force to permit said pawl (34) to pivot from said inoperative position into said locking engagement with said catch (36).

2. An assembly as set forth in claim 1 further characterized by said pivot axis of said pawl being spaced above said pivot axis of said hinge means.

3. An assembly as set forth in claim 1 further characterized by said latch means (18) being disposed on one lateral side of said seat and backrest members and said assembly (10) including a recliner mechanism (20) disposed on an opposite lateral side of said seat and backrest members (12, 14) as said inertia responsive latch means (18) spaced laterally from said inertia responsive latch means (18) for normally controlling the angular positioning of said backrest member (14).

4. An assembly as set forth in claim 1 further characterized by said assembly including hinge means (16) comprising a backrest hinge arm (22) attached to said backrest member (14), a seat hinge arm (28) attached to said seat member (12), and a pivot pin (32) interconnecting said arms (22, 28) and defining a pivot axis of said hinge means (16).

5. An assembly as set forth in claim 4 further characterized by said pawl (34) being pivotally supported by said backrest hinge arm (22) and said seat hinge arm (28) including said catch (36).

6. An assembly as set forth in claim 5 further characterized by said catch (36) including a notch (64) formed in said seat hinge arm (28) for receiving a leg (40) of said pawl (34) upon the occurrence of the rapid acceleration forces to lock said backrest member (14) against rearward reclining movement.

7. An assembly as set forth in claim 1 further characterized by said pawl (34) having first (38) and second (40) legs, and said backrest hinge arm (22) having a stop (72), said first leg (38) engaging said backrest stop (72) and said second leg (40) engaging said catch (36) when said pawl (34) is in said operative locking position.

8. An assembly as set forth in claim 7 further characterized by said second leg (40) and said catch (36) having cooperating camming surfaces which abut one another when said pawl (34) is in said locked position.

9. The assembly of claim 1 further characterized by said pawl positioning means (80) comprising a positioning guide secured to said seat member (12) and having a stop portion (82) adjacent said latch pawl (34), said latch pawl (34) maintaining sliding engagement with said stop portion (82) during normal tilting of said backrest member (14) to limit the movement of said pawl (34) away from said catch (36) and to adjust said inoperative angular position of said pawl (34).

10. A seat assembly for disposition within an automotive vehicle, said assembly comprising:
   a seat member (12) for attachment to a support structure of the vehicle;
   a backrest member (14) hingedly coupled to said seat member (12) for tilting movement between a generally upright position (D) with respect to said seat member (12) and a reclined position (R) in which said backrest member (14) is tilted rearwardly of said upright position (D) angularly away from said seat member (12);
   a latch pawl (34) having first (38) and second (40) legs and supported by said backrest member (14) for selective pivotal movement about a pivot axis of said latch pawl (34) and an associated catch (36) provided on said seat member (12), said latch pawl (34) having a center of gravity that is offset with respect to said pivot axis causing said latch pawl (34) to be gravity biased angularly toward an inoperative position out of locking engagement with said catch (36) to permit normal adjustments to be made to the tilt angle of said backrest member (14) relative to said seat member (12) and responsive to application of a sudden acceleration force to said seat assembly for pivoting into locking engagement with said catch (36) to thereby lock said backrest member (14) against rearward tilting movement toward said reclined position (R);
   and characterized by said backrest member (14) including a stop (72) positioned with respect to said latch pawl (34) such that said first leg (38) of said latch pawl (34) engages said stop (72) and said second leg (40) engages said catch (36) when said latch pawl (34) is in said locking engagement with said catch (36).

11. An assembly as set forth in claim 10 further characterized by said second leg (40) and said catch (36) having cooperating camming surfaces which confront one another when said pawl (34) is in said locking engagement with said catch (36) to urge said first leg (38) angularly toward engagement with said stop (72).

* * * * *